US012567799B2

(12) United States Patent
Stuler

(10) Patent No.: US 12,567,799 B2
(45) Date of Patent: Mar. 3, 2026

(54) REFERENCE SINE GENERATOR FOR PFC CONTROLLER

(71) Applicant: SEMICONDUCTOR COMPONENTS INDUSTRIES, LLC, Scottsdale, AZ (US)

(72) Inventor: Roman Stuler, Karolinka (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 234 days.

(21) Appl. No.: 18/629,746

(22) Filed: Apr. 8, 2024

(65) Prior Publication Data

US 2025/0317050 A1     Oct. 9, 2025

(51) Int. Cl.
H02M 1/42 (2007.01)
H02M 1/00 (2006.01)
(52) U.S. Cl.
CPC ....... H02M 1/4208 (2013.01); H02M 1/0025 (2021.05); H02M 1/4225 (2013.01)
(58) Field of Classification Search
CPC ............. H02M 1/4208; H02M 1/0025; H02M 1/4225; H02M 1/4233; H02M 1/32; H02M 7/219; Y02B 70/10
See application file for complete search history.

(56) References Cited

U.S. PATENT DOCUMENTS 8,148,956 B2    4/2012  Hwang et al.
8,154,269 B2 *  4/2012  Wu ..................... H02M 1/4225
                                                 323/284
8,427,128 B2 *  4/2013  Tsai ...................... H02M 3/156
                                                 323/284
9,537,387 B2 *  1/2017  Cui ..................... H02M 1/4208
10,291,130 B2 * 5/2019  Eum ..................... H05B 45/31
10,910,954 B1 * 2/2021  Shah ...................... H01R 24/60
(Continued)

OTHER PUBLICATIONS

Teodorescu, Remus, et al., "Grid Converters for Photovoltaic and Wind Power Systems", John Wiley & Sons, Technology & Engineering, ISBN: 978-0-470-05751-3, Jul. 28, 2011, 407 pages.
(Continued)

*Primary Examiner* — Yusef A Ahmed
(74) *Attorney, Agent, or Firm* — Dickinson Wright PLLC; Erik A. Heter

(57)     ABSTRACT

A power factor correction (PFC) controller for a PFC switching power supply is disclosed. The PFC controller includes an AC sense terminal, a DC sense terminal, and a reference signal generator coupled to the AC sense terminal. The reference signal generator is configured to receive a divided reference signal generated based on a modified version of an AC input signal and generate a synthesized reference signal using information indicative of an amplitude and a frequency of the divided reference signal. The reference signal generator is further configured to select one of the divided and synthesized reference signals as an output reference signal based on a current amplitude of the divided reference signal. The PFC controller is configured to, based on the output reference signal and a DC voltage sensed on the DC sense terminal, regulate output power provided to a downstream power converter coupled to the PFC switching power supply.

20 Claims, 8 Drawing Sheets

(56) References Cited

U.S. PATENT DOCUMENTS

| | | | | |
|---|---|---|---|---|
| 2005/0219871 A1* | 10/2005 | Li | H02M 1/4225 | 363/21.1 |
| 2007/0101176 A1* | 5/2007 | Yeh | G06F 1/26 | 713/323 |
| 2008/0246444 A1* | 10/2008 | Shao | H02M 1/4225 | 323/207 |
| 2008/0272748 A1* | 11/2008 | Melanson | H02M 1/4225 | 323/205 |
| 2009/0091872 A1* | 4/2009 | Ueda | H10D 89/819 | 361/91.1 |
| 2009/0212756 A1* | 8/2009 | Shao | H02M 1/4225 | 323/285 |
| 2010/0019694 A1* | 1/2010 | Chen | H05B 41/2828 | 315/297 |
| 2011/0057575 A1* | 3/2011 | Lin | H05B 45/10 | 315/279 |
| 2011/0170324 A1* | 7/2011 | Hsieh | G05F 1/70 | 363/75 |
| 2011/0285301 A1* | 11/2011 | Kuang | H05B 45/10 | 315/200 R |
| 2011/0298390 A1* | 12/2011 | Su | H05B 45/385 | 315/291 |
| 2013/0051096 A1* | 2/2013 | Carletti | H02M 1/4225 | 363/84 |
| 2013/0163300 A1* | 6/2013 | Zhao | H02M 1/4225 | 363/89 |
| 2013/0322122 A1* | 12/2013 | Sigamani | H02M 7/06 | 363/13 |
| 2014/0103861 A1* | 4/2014 | Carletti | H02M 1/4225 | 323/205 |
| 2014/0132172 A1* | 5/2014 | Zhu | H05B 45/37 | 315/210 |
| 2015/0062985 A1* | 3/2015 | Colbeck | H02M 1/4225 | 363/89 |
| 2015/0303790 A1* | 10/2015 | Lin | H02M 1/4225 | 363/89 |
| 2015/0333764 A1* | 11/2015 | Pastore | H03M 1/68 | 341/145 |
| 2015/0346665 A1* | 12/2015 | Ogawa | G03G 15/80 | 399/37 |
| 2016/0066388 A1* | 3/2016 | Seki | H02M 3/33546 | 315/200 R |
| 2016/0134182 A1* | 5/2016 | Zhang | H05B 45/3725 | 363/15 |
| 2016/0380528 A1* | 12/2016 | Gao | H02M 1/15 | 363/21.12 |
| 2017/0187292 A1* | 6/2017 | Schaemann | H02M 1/44 | |
| 2019/0044435 A1* | 2/2019 | Kim | H02M 1/4225 | |
| 2019/0115826 A1* | 4/2019 | Leisten | H02M 3/157 | |
| 2019/0326810 A1* | 10/2019 | Hashimoto | H02J 7/0071 | |
| 2020/0195163 A1* | 6/2020 | Wang | H02M 1/425 | |
| 2020/0228012 A1* | 7/2020 | Lynch | H02M 3/158 | |
| 2021/0376714 A1* | 12/2021 | Tsou | G01R 19/175 | |
| 2024/0204663 A1* | 6/2024 | Torres | H02M 3/156 | |
| 2024/0348157 A1* | 10/2024 | Hwang | H02M 1/4208 | |

OTHER PUBLICATIONS

MPS, "HR1275: CrM/DCM PFC and Current Mode LLC Digital Combo Controller, Configurable via UART Interface", https://www. monolithicpower.com/en/hr1275.html, accessed Mar. 29, 2024, 3 pages.

* cited by examiner

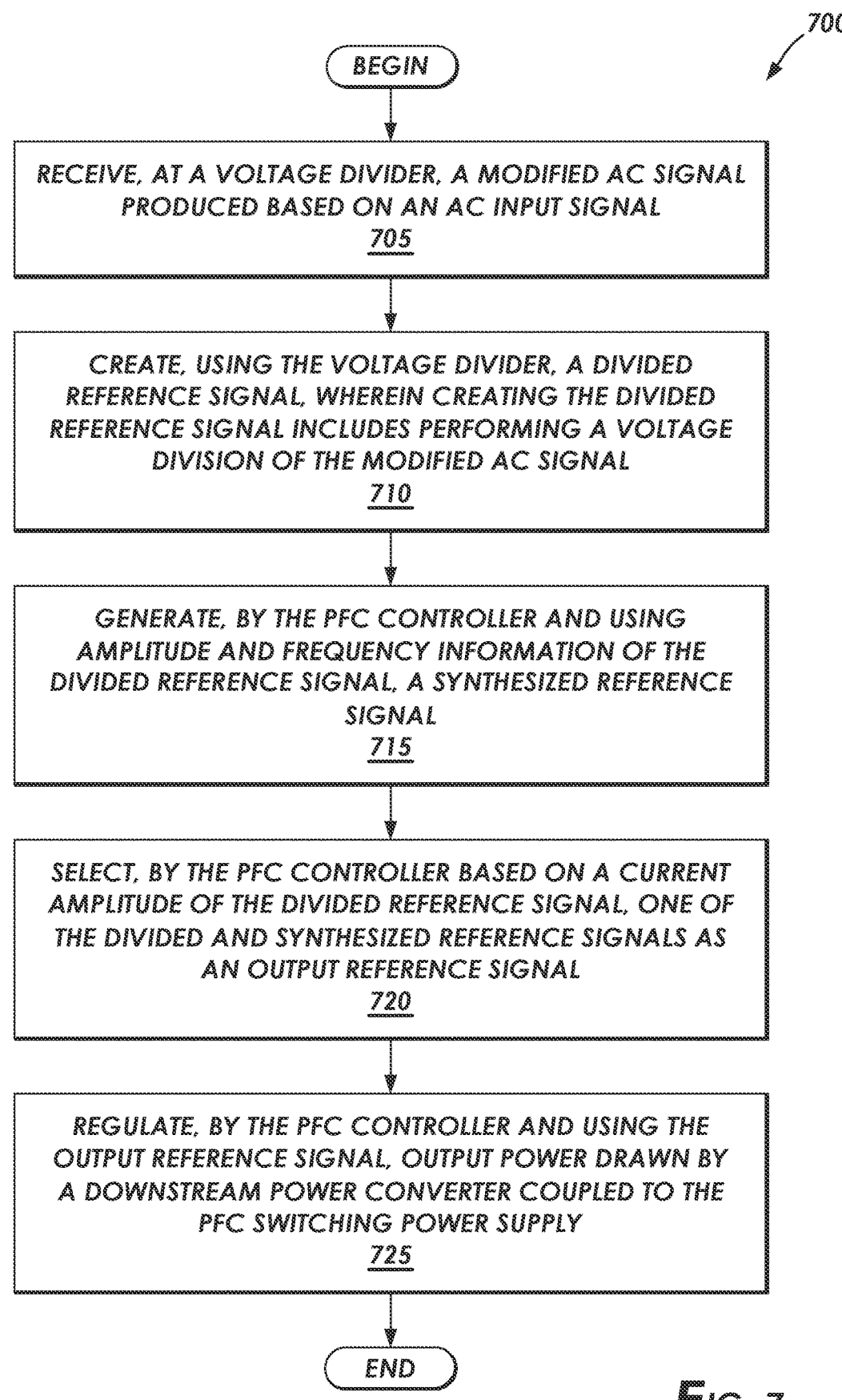

*700*

BEGIN

RECEIVE, AT A VOLTAGE DIVIDER, A MODIFIED AC SIGNAL
PRODUCED BASED ON AN AC INPUT SIGNAL
705

CREATE, USING THE VOLTAGE DIVIDER, A DIVIDED
REFERENCE SIGNAL, WHEREIN CREATING THE DIVIDED
REFERENCE SIGNAL INCLUDES PERFORMING A VOLTAGE
DIVISION OF THE MODIFIED AC SIGNAL
710

GENERATE, BY THE PFC CONTROLLER AND USING
AMPLITUDE AND FREQUENCY INFORMATION OF THE
DIVIDED REFERENCE SIGNAL, A SYNTHESIZED REFERENCE
SIGNAL
715

SELECT, BY THE PFC CONTROLLER BASED ON A CURRENT
AMPLITUDE OF THE DIVIDED REFERENCE SIGNAL, ONE OF
THE DIVIDED AND SYNTHESIZED REFERENCE SIGNALS AS
AN OUTPUT REFERENCE SIGNAL
720

REGULATE, BY THE PFC CONTROLLER AND USING THE
OUTPUT REFERENCE SIGNAL, OUTPUT POWER DRAWN BY
A DOWNSTREAM POWER CONVERTER COUPLED TO THE
PFC SWITCHING POWER SUPPLY
725

END

REFERENCE SINE GENERATOR FOR PFC CONTROLLER

CROSS-REFERENCE TO RELATED APPLICATIONS

Not applicable.

BACKGROUND

The present disclosure is directed to power factor correction (PFC) switching power supplies. PFC switching power supplies are used to convert an AC input signal into a DC voltage that may be used by a downstream power supply (e.g., a buck converter). A PFC switching power supply may operate to increase a power factor, or ratio between apparent power and real power absorbed by the downstream power supply. In order to increase the power factor, some PFC controllers utilize a reference sine wave. Using the reference sine wave, the PFC controller attempts to align input current and input voltage waveforms with one another so as to make the load appear more resistive and thus less reactive. By making the load appear more resistive, the power factor is increased.

SUMMARY

A power factor correction (PFC) controller for a PFC switching power supply is disclosed. In one embodiment, the PFC controller includes an AC sense terminal and a DC sense terminal, and a reference signal generator coupled to the AC sense terminal. The reference signal generator is configured to receive a divided reference signal generated based on a modified version of an AC input signal and generate a synthesized reference signal using information indicative of an amplitude and a frequency of the divided reference signal. The reference signal generator is further configured to select one of the divided and synthesized reference signals as an output reference signal based on a current amplitude of the divided reference signal. The PFC controller is configured to, based on the output reference signal and a DC voltage sensed on the DC sense terminal, regulate output power provided to a downstream power converter coupled to the PFC switching power supply.

In various implementations, the PFC controller is configured to control a power factor of the PFC switching power supply based on the output reference signal. The reference signal generator includes a synthesizer configured to store a plurality of digital values and further configured to generate the synthesized reference signal using the plurality of digital values, and a peak detector configured to determine a peak magnitude of the divided reference signal and provide an indication of the peak magnitude to the synthesizer. The reference signal generator further includes a first comparator configured to generate a first trigger signal based on a comparison of a voltage of the divided reference signal to a first threshold value; a first counter configured to generate a first count value in response to assertion of the first trigger signal, wherein the first count value is indicative of a period of the divided reference signal; a second counter configured to generate a second count value in response to assertion of the first trigger signal; and a second comparator configured to cause the second counter to stop incrementing in response to comparing the voltage of the divided reference signal to a second threshold. The second count value is indicative of a particular time interval. The reference signal generator also includes a control logic configured to, using the first and second count values, cause the synthesizer to generate and store the plurality of digital values.

The disclosure further contemplates a multiplexer configured to select the one of the divided and synthesized reference signals as the output reference signal. In one implementation, the multiplexer is configured to select the divided reference signal as the output reference signal for a first interval that includes a peak amplitude of the AC input signal and further configured to select the synthesized reference signal for a second interval that includes a zero-crossing of the AC input signal. The multiplexer may also (or alternatively) be configured to select the synthesized reference signal as the output reference signal after a predetermined number of cycles of the AC input signal. The multiplexer may also (or alternatively) be configured to alternate selection of the divided and synthesized reference signals during a first interval that includes a peak amplitude of the AC input signal, and further configured to select the synthesized reference signal for a second interval that includes a zero-crossing of the AC input signal.

In one embodiment, a method of operating a power factor correction (PFC) switching power supply includes receiving, by a voltage divider, a modified AC signal produced based on an AC input signal; creating, using the voltage divider, a divided reference signal, wherein creating the divided reference signal includes performing a voltage division of the modified AC signal; generating, by the PFC controller and using amplitude and frequency information of the divided reference signal, a synthesized reference signal; selecting, by the PFC controller based on a current amplitude of the divided reference signal, one of the divided and synthesized reference signals as an output reference signal; and regulating, by the PFC controller and using the output reference signal, output power supplied to a downstream power converter coupled to the PFC switching power supply.

Various implementations of the method include selecting the divided reference signal as the output reference signal for a first interval that includes a peak amplitude of the AC input signal and selecting the synthesized reference signal for a second interval that includes a zero-crossing of the AC input signal. Embodiments of the method may also includes selecting the synthesized reference signal as the output reference signal after a predetermined number of cycles of the AC input signal. An implementation of the method is also contemplated that includes alternating selection of the divided and synthesized reference signals during a first interval that includes a peak amplitude of the AC input signal and selecting the synthesized reference signal for a second interval that includes a zero-crossing of the AC input signal.

In some implementations, the method includes storing, in a memory array of a synthesizer, a plurality of digital values and producing the synthesized reference signal using the plurality of digital values. In such implementations, generating the plurality of digital values may include comparing, using a first comparator, a voltage of the divided reference signal to a first threshold value and generating, using a first counter, a first count value in response to the first comparator determining that the voltage of the divided reference signal exceeds the first threshold value, wherein the first count value is indicative of a period of the divided reference signal. Generating the plurality of digital values may further includes incrementing, using a second counter, a second count value in response to the first comparator determining that the voltage of the divided reference signal exceeds the first threshold value; comparing, using a second comparator, the voltage of the divided reference signal to a second threshold; and discontinuing incrementing the second counter in response to the voltage of the divided reference signal falling below the second threshold. The second count value indicates, upon discontinuing incrementing, a time interval between the voltage of the divided reference signal between the first and second thresholds, wherein the time interval includes a peak magnitude of the divided reference signal. The method may also include causing the synthesizer, using control logic and the first and second count values, to store the plurality of digital values.

In one embodiment, a PFC switching supply includes an AC input terminal coupled to receive an AC input signal; a filter configured to reject electromagnetic interference from the AC input signal; a bridge rectifier configured to rectify AC input signal to produce a rectified AC signal; a switching unit configured to produce a DC output voltage using the rectified AC signal; a voltage divider configured to generate a divided reference signal using a modified version of the AC input signal received by the PFC switching power supply; and a controller, wherein the controller includes a reference signal generator configured to generate an output reference signal, wherein the controller is configured to regulate output power drawn by a downstream power supply using the output reference signal. The reference signal generator includes a peak detector configured to detect a peak amplitude of the divided reference signal; a first comparator configured to assert a first trigger signal in response to an amplitude of the divided reference signal exceeding a threshold value; a second comparator configured to assert a second trigger signal in response to the amplitude of the divided reference signal falling below the threshold value; first and second counters configured to generate first and second count values, respectively, based on assertions of the first and second trigger signals; control logic configured to receive information indicative of the peak amplitude from the peak detector and further configured to determine a period and a phase of the divided reference signal based on the first count value and further configured to determine a particular time interval relative to the peak amplitude based on the second count value; a synthesizer configured to digitally generate a synthesized reference signal using information received from the control logic indicative of the period, phase, and peak amplitude of the divided reference signal; and a multiplexer, wherein the control logic is further configured to cause the multiplexer to select one of the divided and synthesized reference signals as the output reference signal. The control logic is configured to cause the multiplexer to select the synthesized reference signal as the output reference signal for a time interval that includes a zero-crossing of the AC input signal.

BRIEF DESCRIPTION OF THE DRAWINGS

For a detailed description of example embodiments, reference will now be made to the accompanying drawings in which:

FIG. 7 is a flow diagram of one embodiment of a method for operating a PFC controller.

DEFINITIONS

Figure 1:
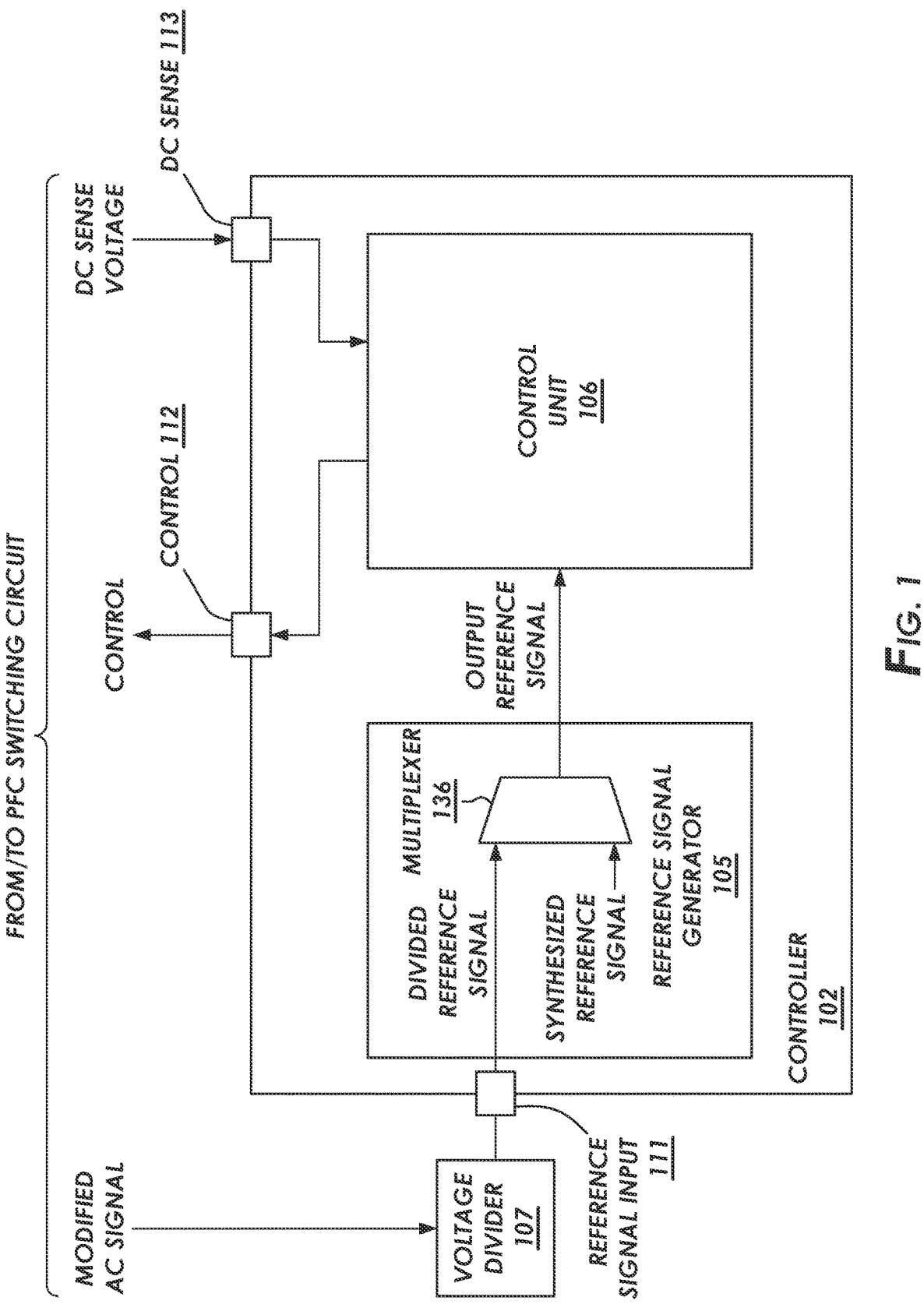
FIG. 1 is a block diagram of one embodiment of a PFC controller with a reference sine generator.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean creating or maintaining a first predetermined state of a Boolean signal. Boolean signals may be asserted high or with a higher voltage, and Boolean signals may be asserted low or with a lower voltage, at the discretion of the circuit designer. Similarly, "de-assert" shall mean creating or maintaining a second predetermined state of the Boolean, opposite the asserted state.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

PFC controllers utilize a reference sine wave that serves as a target for ensuring that a power factor of a corresponding PFC switching power supply is close to unity. More closely matching the reference sine wave to the AC input of a PFC switching power supply allows for a higher power factor. The reference sine wave may be generated in various ways, although these different methods have drawbacks. A reference signal generated by a high impedance divider may be distorted, particularly near zero crossing events due to, e.g., parasitic capacitances. Some PFC controllers may generate a reference signal purely in the digital domain using digital signal processing (DSP) circuits. The use of DSP circuits can consume excess power and require excess complexity for some applications, particularly for consumer applications with light load conditions. Other controllers may perform current compensation in lieu of generating a reference signal.

The present disclosure uses a combination of methods to generate a reference signal. These methods include utilizing a divided version of a modified AC input signal (hereinafter "divided" reference signal) in combination with the utilization of a digitally generated input signal (hereinafter "synthesized" reference signal). An output reference signal may be composed partially of the divided and synthesized reference signals. More particularly, the divided reference signal may be used as the output reference signal for an interval that includes a peak of the AC input signal, while the synthesized reference signal may be used as the output reference signal for an interval that includes a zero crossing of the AC input signal. The disclosure also contemplates embodiments in which, once generated, the synthesized reference signal is used for the full cycle, and other embodiments in which a combination of the divided and synthesized reference signals used in the interval corresponding to the peak of the AC input signal (to provide averaging). By using the synthesized reference signal for at least the portions corresponding to the zero-crossings, harmonic distortion may be reduced or eliminated from the output reference signal. As a result, the PFC controller may provide a greater power factor and thus more efficient operation of the PFC switching power supply. The structure and operation of a reference signal generator is now discussed further with reference to the drawings.

Turning now to FIG. 1, a block diagram of one embodiment of a PFC controller is shown. In the illustrated example, PFC controller 102 is configured to carry out control functions for a PFC switching power supply that is configured to, using a received AC input signal, generate a DC output signal that can be used by a downstream load circuit, such as another power converter (e.g., a buck converter). As such, PFC controller 102 as shown here is configured for coupling to a PFC switching circuit that carries out the AC to DC conversion under its control.

PFC controller 102 as shown here includes a reference signal generator 105 and a control unit 106. A voltage divider 107 as shown here is configured to generate a divided reference signal based on a modified AC signal produced using an AC input signal. Reference signal generator 105 is configured to receive the divided reference signal via reference signal input terminal 111. The divided reference signal is generated based on an AC input signal received by a PFC switching power supply controlled by PFC controller 102. Using the divided reference signal, reference signal generator 105 may generate a synthesized reference signal. Details of the generation of these two reference signals are discussed in further detail below. Both the divided reference signal and the synthesized reference signal are provided to a multiplexer 136. Based on a selection made between the two, multiplexer 136 may provide either the divided or the synthesized reference signals as an output reference signal. In various embodiments, the synthesized reference signal may be selected for at least intervals corresponding to the zero-crossing of the AC input signal, as the divided reference signal may be subject to distortion during these same intervals.

The output reference signal is provided to control unit 106. Using the output reference signal and a DC sense voltage received via a DC sense terminal 113, control unit 106 may carry out various control functions to generate a control signal provided to a switch of the PFC switching power supply via control terminal 112. Control unit 106 may include various circuits that generate additional signals based on the output reference signal and the DC sense voltage. Among the circuits included in control unit 106 may be a modulator that, based on the signals generated using the output reference signal and DC sense voltage, generates the control signal output either directly or through a driver circuit to control the switch of the PFC switching power supply. The control signal output from PFC controller 102 may modulate the on-time of the switch using a modulation scheme such as pulse width modulation (PWM, in which the width of pulses is modulated through control of the switch on-time), and may additionally use pulse frequency modulation (PFM, in which the frequency at which pulses are provided is modulated through control of the frequency at which the switch is activated) in some embodiments. Through the control of the on-time of the switch, the DC voltage, output power, and power factor of the PFC switching power supply may be controlled.

Figure 2:
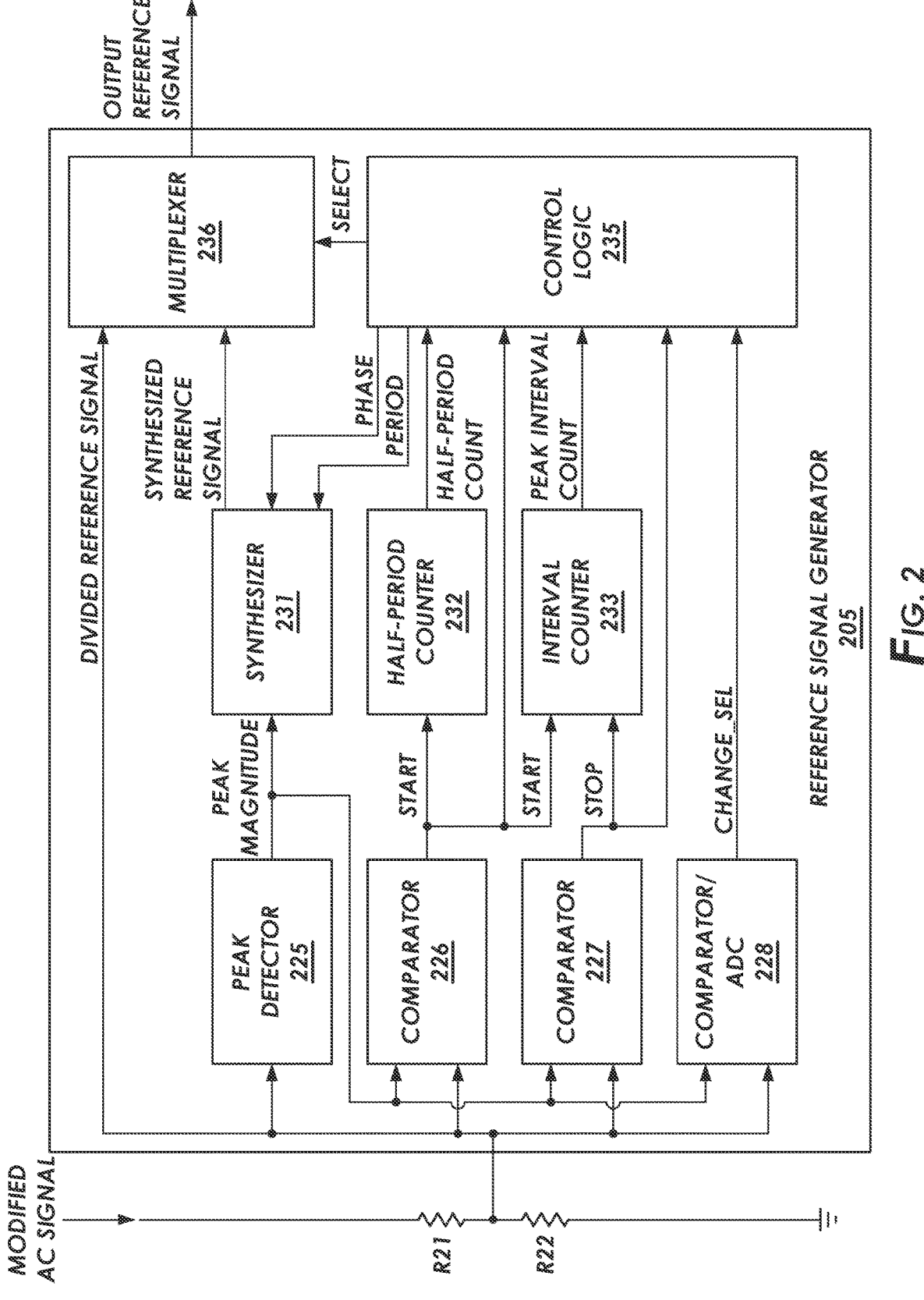
FIG. 2 is a block diagram of one embodiment of a reference sine generator.

FIG. 2 is a block diagram of one embodiment of a reference signal generator. In the example shown, reference signal generator 205 is configured to receive a divided reference signal, and is further configured to provide an output reference signal to, e.g., a control unit such as that discussed above with reference to FIG. 1. A modified AC signal that, may be a rectified version of the AC input signal received by the PFC switching power supply, may be used to generate the divided reference signal using, e.g., a voltage divider.

As shown here, the modified AC signal is received by a voltage divider circuit that includes resistors R21 and R22. More generally, these resistors may represent high impedances in a voltage divider circuit configured to produce the divided reference signal. The voltage divider of R21 and R22 as shown here performs a voltage division which generates, on the junction of these two resistors (or impedances), the divided reference signal. The divided reference signal is provided to multiplexer 236 as well as other units of reference signal generator 205.

Peak detector 225 in this example is coupled to receive the divided reference signal. Circuitry within peak detector 225 is configured to detect a peak magnitude of the divided reference signal. Various types of circuits may be used to detect the peak magnitude, such as a capacitor that is charged by the rising AC signal through a forward-biased diode and maintains its charge (which is indicative of the peak magnitude) after the diode becomes reverse-biased during the falling of the AC signal. Embodiments in which the peak magnitude is detected in the digital domain (after conversion to the latter by an analog-to-digital converter) are also possible and contemplated. The indication of the peak magnitude output from peak detector 225 is provided to synthesizer 231, as well as to comparators 226 and 227, as well as to comparator/ADC 228.

Comparator 226 in the illustrated example is coupled to receive the divided reference signal along with the peak magnitude indication. In this particular implementation, comparator 226 is a rising-edge comparator that is configured to generate an output signal upon the voltage of the rising portion of the divided reference signal exceeding a particular threshold value. The threshold value may be determined internally by circuitry within comparator 226 based on the peak magnitude as indicated by peak detector 225. In response to the rising voltage of the divided reference signal exceeding the threshold value, comparator 225 asserts a corresponding output signal, the Start signal. In response to assertion of the Start signal, half-period counter 232 and interval counter 233 begin incrementing. The Start signal is also provided to control logic 235 in this example.

Comparator 227 in this implementation is a falling-edge comparator, and is configured to assert a corresponding output signal when the voltage of the divided reference signal falls below a threshold. As with comparator 226, comparator 227 may determine the threshold value based on the peak magnitude as indicated by peak detector 225. Furthermore, this threshold may have the same value as the threshold determined by comparator 226, although embodiments are possible and contemplated in which the thresholds used by the respective comparators are different. Upon the voltage of the reference signal falling below the threshold, comparator 227 in this example asserts a corresponding output signal, the Stop signal. In response to assertion of the Stop signal, interval counter 233 discontinues incrementing. The Stop signal is also provided to control logic 235.

In some embodiments, additional comparators and counters (e.g., for interval timing) may be included in reference signal generator 205. This may allow for more accurate determination of the peak point and phase of the divided reference signal. For example, calculations may be averaged between two different interval counters to more accurately determine the phase.

Half-period counter 232 is configured to, once incrementing has begun, to continue counting until the next instance of assertion of the Start signal by comparator 226. Upon the next instance of assertion of the Start signal, the half-period counter 232 is reset and begins incrementing again. The final count value just prior to the reset corresponds to a half-period of the divided reference signal. Using this final count value, control logic 235 may determine the frequency of the divided reference signal.

Interval counter 233 in the example shown is configured to begin incrementing in response to assertion of the start signal, and to discontinue incrementing in response to assertion of the Stop signal. The resulting count value accumulated between assertion of the Start and Stop signals is referred to here as a peak interval count, and is indicative of a peak interval. As defined herein, the peak interval is a duration of the interval between a time the rising voltage of the divided reference signal exceeds a first threshold and a time when the falling voltage of the divided reference signal falls below a second threshold. In the example shown in FIG. 2, the peak interval occurs between the time the Start signal is asserted by comparator 226 and the Stop signal is asserted by comparator 227. In embodiments in which the first and second thresholds are equal, the waveform during the peak interval is symmetrical. The comparison of the rising voltage of the divided reference signal with the first threshold, as noted above, is carried out by comparator 226 in the illustrated example. Similarly, the comparison of the falling voltage of the divided reference signal, as also noted above, is carried out by comparator 227.

Using the half-period count value, control logic 235 as shown here may determine the period (and thus frequency) of the divided reference signal. Using the peak interval count value, control logic 235 may determine the phase of the reference signal. The period (or frequency) and phase values may then be provided to synthesizer 231 to enable generation of the synthesized reference signal.

Using the received period/frequency and phase information, as well as the peak magnitude, synthesizer 231 may generate a plurality of digital values. These digital values are then stored in a memory array included within synthesizer 231. To generate the synthesized reference signal, these values may be read out of the memory array in a sequence that, converted into analog, results in the synthesized reference signal be produced on the output of a DAC. The synthesized reference signal in this example is received by multiplexer 236, where it may be selected as the output reference signal. It is noted that alternative embodiments are possible and contemplated in which the output reference signal, and thus the synthesized reference signal, are utilized in the digital domain. In such embodiments, the divided reference signal may also be converted into the digital domain. An example of a synthesizer that may be utilized to produce a synthesized reference signal is discussed in further detail below with reference to FIG. 4.

Comparator/ADC 228 in the illustrated example is coupled to receive the divided reference signal from the voltage divider comprising R21 and R22, and the peak magnitude from peak detector 225. Using the peak magnitude, comparator/ADC 228 may generate thresholds that are used as a basis for switching between the divided reference signal and the synthesized reference signal. For example, using the peak magnitude value, comparator/ADC 228 may generate a particular threshold value that, when exceeded by the voltage of the divided reference signal, causes the divided reference signal to be selected as the output reference signal. In this same example, when the voltage of the divided reference signal is less than the threshold, the synthesized reference signal may be selected as the output reference signal. It is noted that the threshold used as a basis for comparison in comparator/ADC 228 may be different than the threshold(s) used in comparators 226 and 227. For example, a threshold used as a basis of comparison by comparator/ADC 228 may be 50% of the peak magnitude of the divided reference signal, while a threshold used by both of comparators 226 and 227 may be a greater value. The output of comparator/ADC 228 in this particular implementation is the Change_Sel signal, which indicates to control logic 235 that the source for the output reference signal is to be changed by multiplexer 236.

In some embodiments, comparator/ADC 228 includes an ADC configured to convert comparison results into a digital format. In such implementations, additional information may be conveyed to control logic 235, such as a difference between the present voltage of the divided reference signal and the threshold value used as the basis for comparison. Such information could be used in various ways, such as ensuring that the phase of the divided reference signal has not drifted from its originally determined value, and if so, indicate that a recalculation of the phase is in order.

Selection of the divided or synthesized reference signal as the output signal is carried out in the example shown by control logic 235. The selection may be performed in various ways. In one example, the divided reference signal may be selected during an interval that includes its peak, while the synthesized reference signal is selected during an interval that corresponds to the zero-crossings of the AC input signal. In another example, the synthesized reference signal may be selected full time subsequent to its initial generation (which may occur over several cycles during an initial startup of reference signal generator 205). In yet another example, the synthesized reference signal may be selected for the portions corresponding to the zero-crossings, while the selection may alternate between the synthesized and divided reference signals for an interval that includes the peaks (e.g., for averaging between the two).

Figure 3:
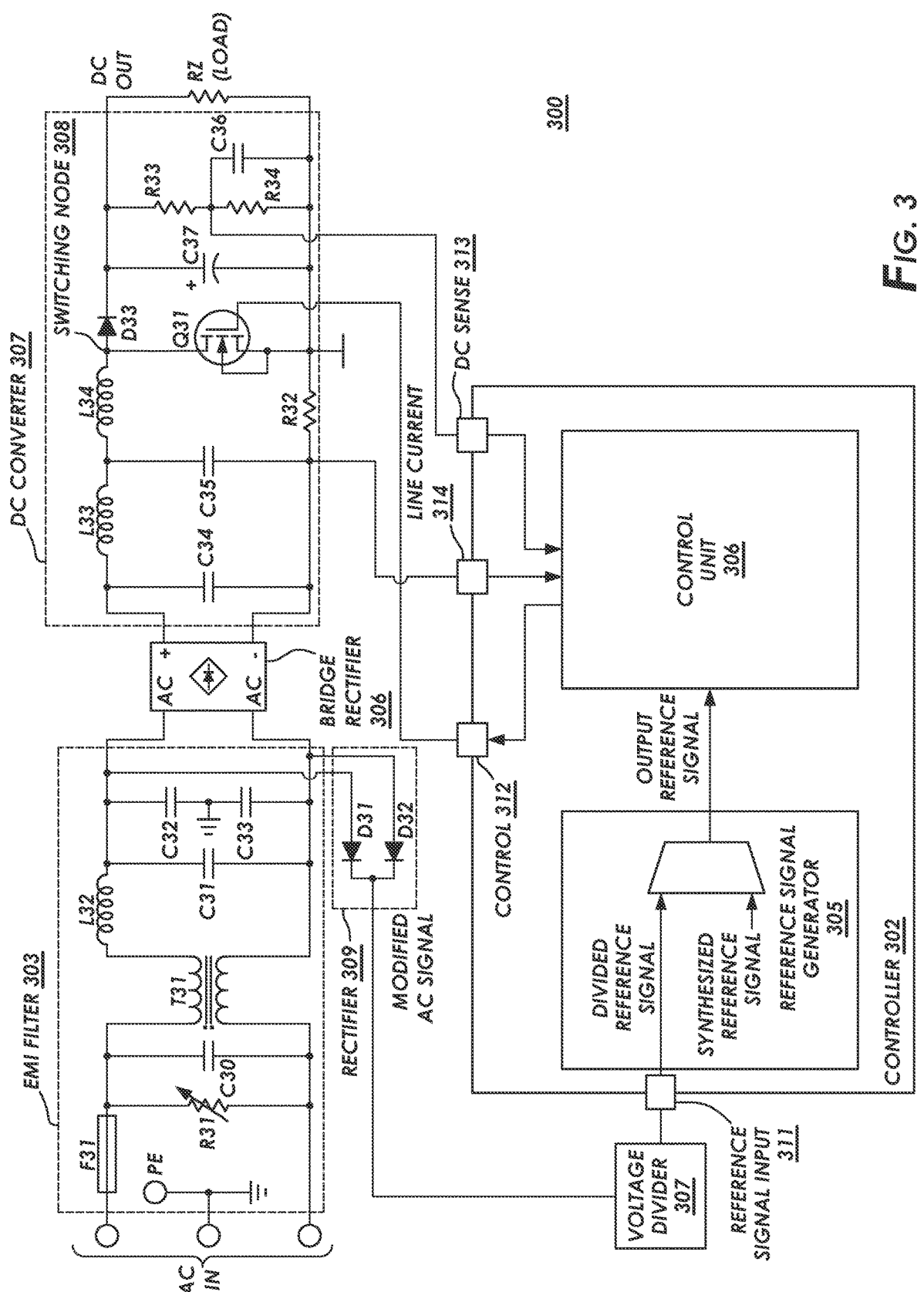
FIG. 3 is a diagram illustrating one embodiment of a PFC converter including a controller and a conversion circuit.

FIG. 3 is a diagram illustrating one embodiment of a PFC switching power supply including a PFC controller. In the illustrated example, PFC switching power supply 300 includes a PFC controller 302 along with additional circuitry for converting an AC input signal into a DC output voltage while regulating the power factor of the power drawn from AC input signal. It is noted that PFC controller 302 as shown here may be implemented in separate packaging from the remaining components shown in the drawing. However, embodiments in which PFC controller 302 is implemented in the same package with at least some of the various other ones of the components shown here are possible and contemplated.

PFC switching power supply 300 includes an EMI (electromagnetic interference) filter 305, a bridge rectifier 306, and a DC converter 307. An AC input signal may be received on the terminals of a first portion of EMI filter 303 (which includes a protective earth, or PE terminal, in this particular example), passed through EMI choke T31, and subsequently passed to a second portion of EMI filter 303. The filtered signal may then be rectified by bridge rectifier 306. The rectified signal output from bridge rectifier 306 is received by DC converter 307, which includes a second EMI filter formed of inductors L33 along with capacitors C34 and C35. DC converter 307 uses L34 and C37 (via diode D33) to alternately store and release energy to smooth out ripple in the rectified signal to produce a DC voltage. Regulation of the DC voltage, and thus the power provided by the PFC switching power supply, is carried out in accordance with the operation of switch Q31. More particularly, the on-time of switch Q31 may be modulated in accordance with the demands of a downstream load (represented in this example by resistor RL) coupled to PFC switching power supply 300. Switch Q31 is coupled to a switching node 308, which is formed at the junction of L34 and the anode of diode D33. The cathode of diode D33 is coupled to a DC output node upon which the output DC voltage and DC power are provided to the downstream load. The downstream load of PFC switching power supply 300 may be another power converter, such as a buck converter, or any other suitable load circuit that can utilize the output power provided by PFC switching power supply 300.

A rectifier 309 in the illustrated example is coupled to EMI filter 303, and includes diodes D31 and D32. Rectifier 309 as shown here is configured to rectify the EMI-filtered AC input signal to produce a modified AC signal. The modified AC signal is provided to voltage divider 307 for use in generating the divided reference signal, which is used, in turn, as a basis for producing the synthesized reference signal.

PFC controller 302 in the example shown is coupled to receive a DC sense voltage via DC sense terminal 313. The DC sense voltage in this embodiment is generated at the junction of resistors R33 and R34, which form a voltage divider to divide the DC output voltage. As the voltage at this junction is dependent on the DC output voltage, variation of the latter is thus sensed on this node, with the corresponding DC sense voltage reflecting this information to PFC controller 302 via DC sense terminal 313.

A shown here, PFC controller 302 includes a line current terminal 314. Through this terminal, a signal indicative of line current in the DC converter 307 may be received. The line current serves as another control input, along with the DC sense voltage and the output reference signal (generated using the modified AC signal) used to regulate the output power provided to a downstream load circuit coupled to PFC switching power supply 300.

Control of the switch Q31 in the illustrated example is carried out via control terminal 312. More particularly, control terminal 312 as shown here is coupled to a gate terminal of Q31. Control unit 306 in the embodiment shown may include a modulator circuit configured to cause activation and deactivation of Q31 in accordance with demands of a load coupled to PFC switching power supply 300. Using the DC sense voltage and the line current values, control unit 306 may control the switching of Q31 to meet the power demands of the load. Using the output reference signal, generated based on the modified AC signal, control circuit 306 may control the switching of Q31 so as to increase the power factor, and thus the efficiency of PFC switching power supply 300. In various embodiments, a modulator may utilize modulation schemes such as PWM, PFM, cycle skip, and burst mode to control the duration and frequency of the switch on-time.

Figure 4:
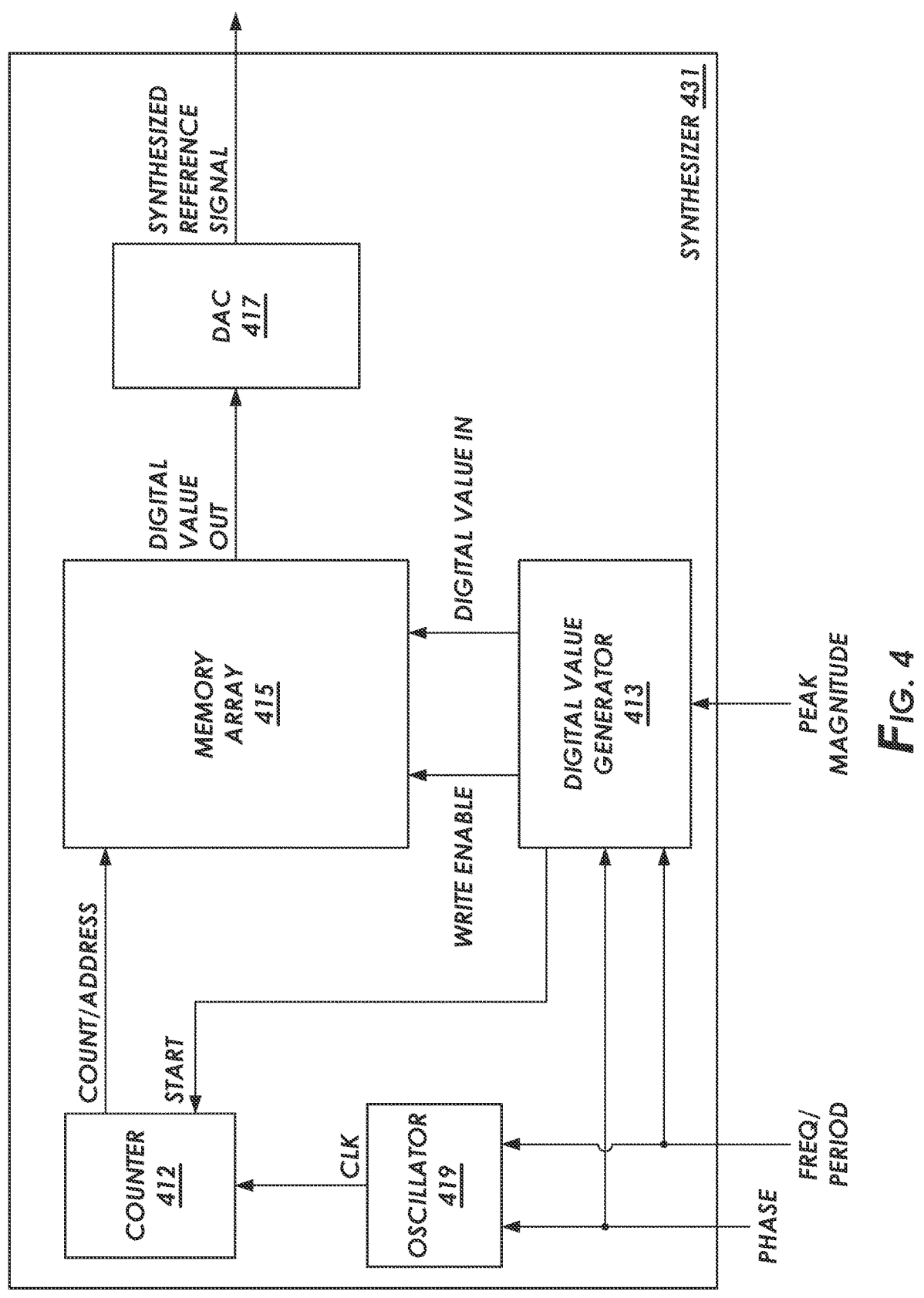
FIG. 4 is a block diagram of one embodiment of a synthesizer for generating a synthesized reference sine.

FIG. 4 is a block diagram of one embodiment of a synthesizer configured to generate a synthesized reference signal in accordance with the disclosure. Synthesizer 431 may be utilized with the various controllers discussed above, although other embodiments of a synthesizer may be used with these controller as well.

In this particular example, synthesizer 431 includes a digital value generator 413, which is coupled to receive information regarding the phase, frequency/period, and peak magnitude of another reference signal, such as the divided reference signal. Using the phase, frequency/period, and peak magnitude information, digital value generator 413 is configured to generate digital values that correspond to an undistorted version of a signal having the phase, frequency, and peak magnitude characteristics as input to synthesizer 431. Digital value generator 413 is may also be configured to assert a write enable signal to allow information to be written into memory array 415. Thus, as they are generated, the digital values are stored in memory array 415 in the illustrated example. Moreover, each digital value is stored at an address indicated by a current count value output by counter 412 ("Count/Address"). Counting/incrementing may begin in the illustrated implementation in response to assertion of the Start signal by digital value generator 413.

A clock signal, Clk, generated by oscillator 419, is used as an input to increment a count value generated by counter 412. Oscillator 419 may generate the clock signal in accordance with the received phase and frequency/period information. In various embodiments, oscillator 419 may be implemented using, e.g., a ring oscillator or other circuit suitable for generating a clock signal. In some implementations, a delay-locked loop (DLL) or other circuit usable to adjust the phase of the clock signal may also be provided.

To generate an analog version of the synthesized reference signal, the digital value generator 413 may again assert the Start signal (at the proper time so keep the synthesized reference signal in its proper phase) while the Write Enable signal is de-asserted. Upon assertion of the Start signal, counter 412 may provide addresses to memory array 415, causing the stored digital values to be read out in a sequence corresponding to the sequence of addresses. Each digital value is provided to a DAC 417, and converted into an analog value. The sequence of digital values converted into an analog format thus results in an analog version of the synthesized reference signal being provided by synthesizer 431. In some situations (e.g., light load conditions, to compensate for reactive current in EMI filter 303 in the embodiment of FIG. 3), the phase of the synthesized reference signal may be phase-shifted relative to the divided reference signal. For example, the digital value generator may delay assertion of the start signal for a pre-determined time before the digital values are read from memory to generate the synthesized reference signal.

Figure 5:
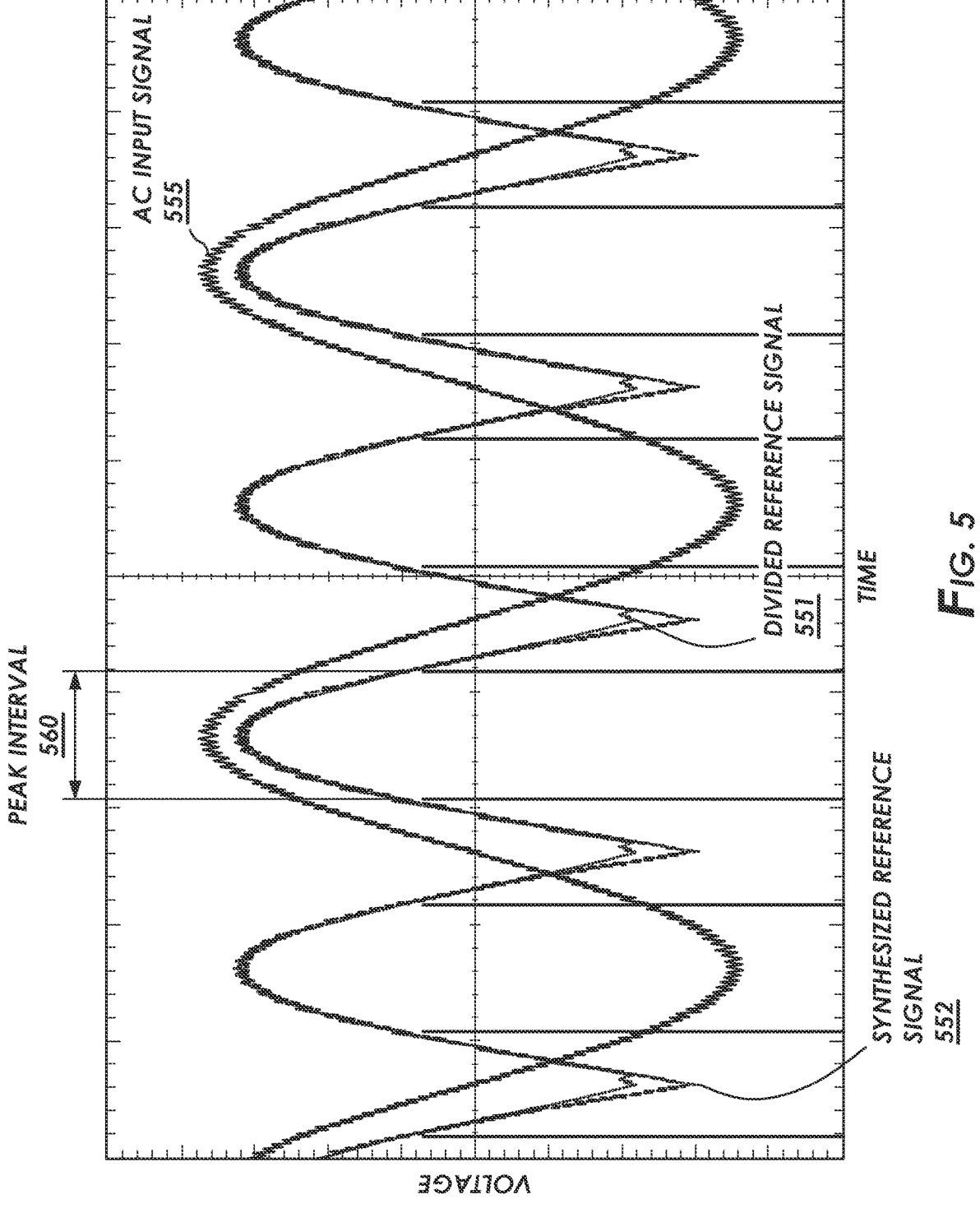
FIG. 5 is a graph illustrating an input AC signal, a divided reference signal, and a synthesized reference sine signal according to an embodiment of the disclosure.

FIG. 5 is a graph illustrating an AC input signal 555, a divided reference signal 551, and a synthesized reference signal 552. The AC input signal 555 may correspond to a signal input into a PFC switching power supply, while the divided and synthesized reference signals may correspond to those that are generated in accordance with the discussion above.

In the example of FIG. 5, the AC input signal 555 is shown as an unrectified signal, while the divided reference signal 551 is shown as a rectified signal. As shown here, the divided reference signal 551 suffers some distortion at points that correspond to the zero-crossing of the AC input signal 555. In contrast, the synthesized reference signal 552 as shown here, in phase with the divided reference signal 551, is not subject to distortion at those points corresponding to the zero-crossing of the AC input signal 555. The distortion to the divided reference signal 551 may be caused by the high-impedance of the circuit elements used to form the voltage divider from which it is generated.

The example shown here also illustrates the peak interval 560 that may be determined by, e.g., a count value of interval counter 233 of FIG. 2 above. As defined above, the peak interval 560 is a duration of the interval between a time the rising voltage of the divided reference signal exceeds a first threshold and a time when the falling voltage of the divided reference signal falls below a second threshold. As shown in FIG. 5, the first and second thresholds may be the same, and thus both the divided and synthesized reference signals are symmetrical in this interval.

Figure 6:
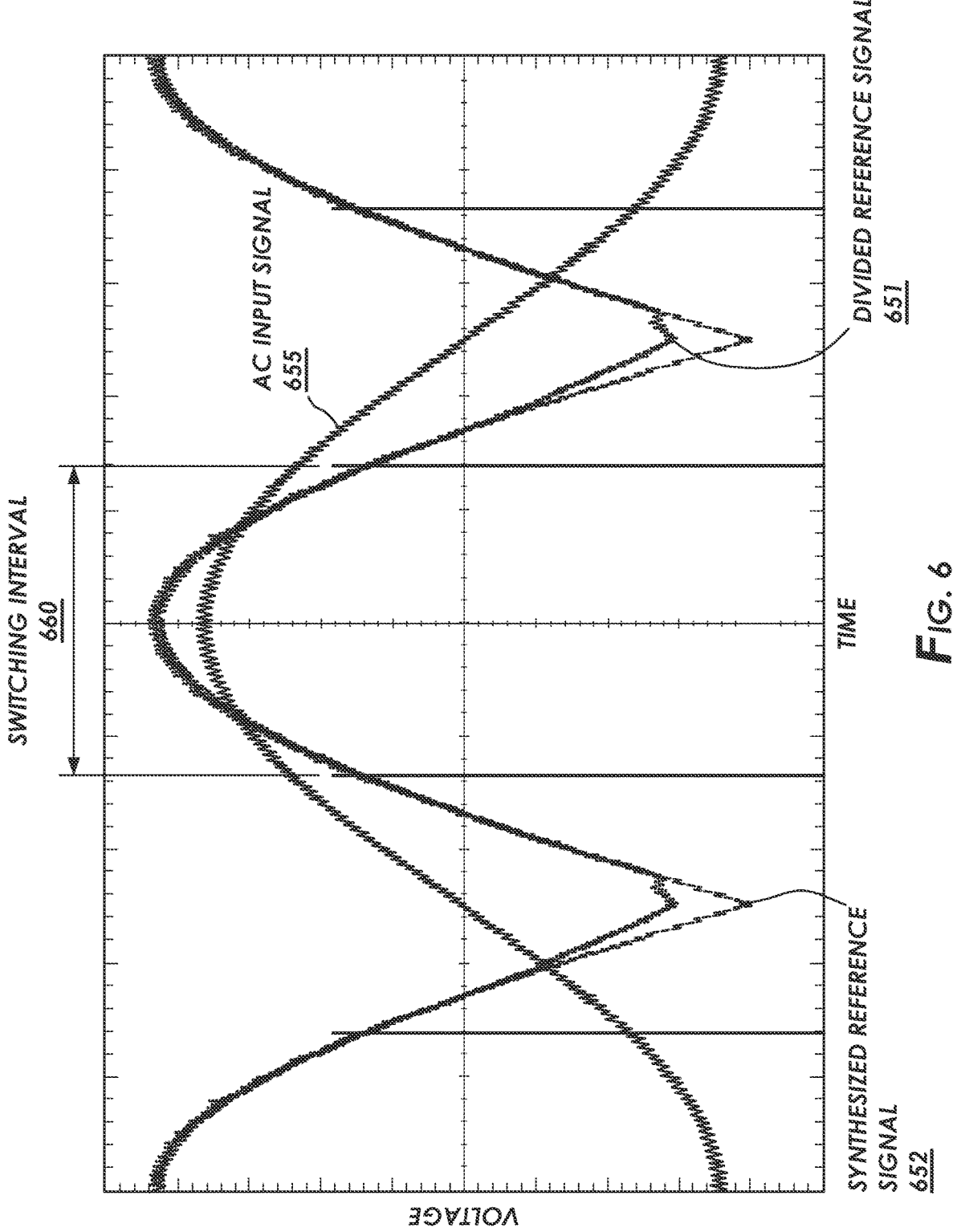
FIG. 6 is another graph illustrating an input AC signal, a divided reference signal, and a synthesized reference sine signal an embodiment of the disclosure.

FIG. 6 is a graph illustrating another example of an AC input signal 655, a divided reference signal 651, and a synthesized reference signal 652. Similar to the example of FIG. 5, the divided reference signal 651 is distorted at points that correspond to the zero-crossing of the AC input signal 655, while the synthesized reference signal 652 is not subject to this distortion.

The example of FIG. 6 further illustrates a switching interval 660, which is similar (and may be the same) as the peak interval 560 discussed above. The switching interval 660 as shown here represents an interval in which the voltage of the divided reference signal is above some threshold, such as one determined by, e.g., comparator/ADC 228 of FIG. 2. In various embodiments of a reference signal generator, either the divided reference signal or the synthesized reference signal may be selected as the output reference signal during this interval. As also noted, a particular implementation of a reference signal generator may also alternate the selection of the divided and reference signals during this interval, effectively averaging out any differences between the two.

Outside of the switching interval 660, various embodiments may select the synthesized reference signal as the output signal. The portions outside of the interval include the points corresponding to the zero-crossing of the AC input signal 655 where the divided reference signal 651 is subject to distortion. Accordingly, this distortion may be avoided in the output reference signal during times outside of the switching interval 660. This may allow for more efficient regulation of the power factor of a corresponding PFC switching power supply.

FIG. 7 is a flow diagram of operation of one embodiment of a PFC controller. Method 700 as discussed herein may be carried out by any of the various implementations of a controller as discussed above. Embodiments of a controller not explicitly discussed herein but otherwise capable of carrying out Method 700 are also considered to fall within the scope of this disclosure.

Method 700 includes receiving, by a voltage divider, a modified AC signal produced based on an AC input signal (block 705). The method further includes creating, using the voltage divider, a divided reference signal, wherein creating the divided reference signal includes performing a voltage division of the modified AC signal (block 710), and generating, by the PFC controller and using amplitude and frequency information of the divided reference signal, a synthesized reference signal (block 715). The method also includes selecting, by the PFC controller based on a current amplitude of the divided reference signal, one of the divided and synthesized reference signals as an output reference signal (block 720) and regulating, by the PFC controller and using the output reference signal, output power drawn by a downstream power converter coupled to the PFC switching power supply (block 725).

In various embodiments, selection of the output reference signal includes selecting the divided reference signal as the output reference signal for a first interval that includes a peak amplitude of the AC input signal and selecting the synthesized reference signal for a second interval that includes a zero-crossing of the AC input signal. Some embodiments of the method includes selecting the synthesized reference signal as the output reference signal after a predetermined number of cycles of the AC input signal. In other implementations, the selecting may be carried out by alternating selection of the divided and synthesized reference signals during a first interval that includes a peak amplitude of the AC input signal selecting the synthesized reference signal for a second interval that includes a zero-crossing of the AC input signal.

In generating the synthesized reference signal, the method may include storing, in a memory array of a synthesizer, a plurality of digital values and producing the synthesized reference signal using the plurality of digital values. Generating the plurality of digital values may include comparing, using a first comparator, a voltage of the divided reference signal to a first threshold value and generating, using a first counter, a first count value in response to the first comparator determining that the voltage of the divided reference signal exceeds the first threshold value, wherein the first count value is indicative of a period of the divided reference signal. Generating the plurality of digital values may further includes incrementing, using a second counter, a second count value in response to the first comparator determining that the voltage of the divided reference signal exceeds the first threshold value, and based on comparing, using a second comparator, the voltage of the divided reference signal to a second threshold, discontinuing incrementing the second counter in response to the voltage of the divided reference signal falling below the second threshold. In this particular embodiment, the second count value indicates, upon discontinuing incrementing, a time interval between the voltage of the divided reference signal between the first and second thresholds, wherein the time interval includes a peak magnitude of the divided reference signal. Using control logic and the first and second count values, the method may also include causing the synthesizer to store the plurality of digital values.

Figure 8:
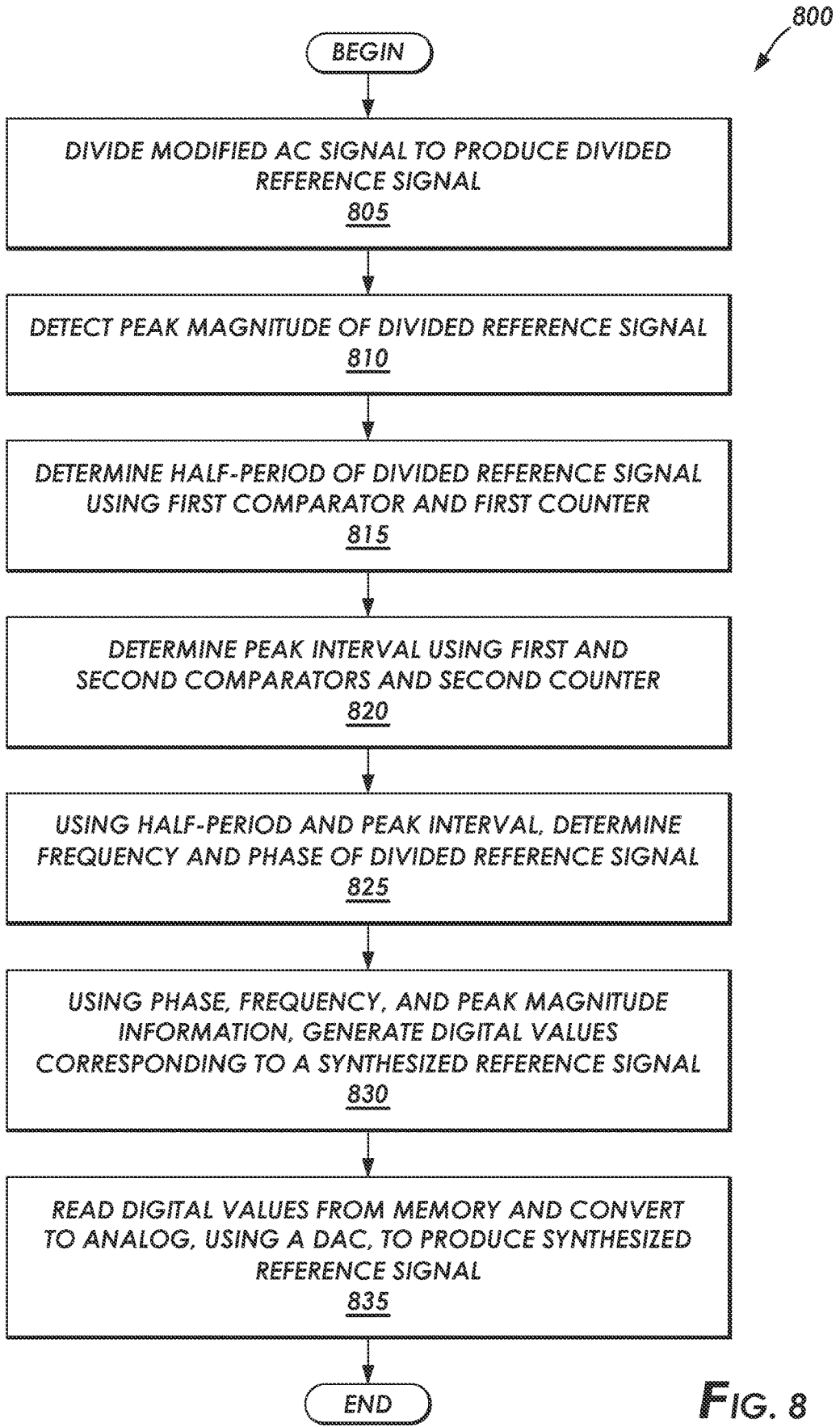
FIG. 8 is a flow diagram of one embodiment of a method for producing a synthesized reference signal.

FIG. 8 is a flow diagram of one embodiment for generating a synthesized reference signal. Method 800 may be carried out by any of the various implementations of a synthesizer as discussed above. A synthesizer capable of carrying out Method 800, but not otherwise disclosed herein, is also considered to fall within the scope of this disclosure.

Method 800 includes dividing (e.g., using a voltage divider) a modified AC signal to produce a divided reference signal (block 805). The modified AC signal may be, in various implementations, a rectified and filtered version of an AC input signal to a PFC switching power supply. The method further includes detecting the peak magnitude of the divided reference signal (block 810). In addition to determining the peak magnitude of the divided reference signal, the method also includes determining its half-period using a first comparator and a first counter (block 815) and determining a peak interval using the first comparator, a second comparator, and a second counter (block 820). As defined above, the peak interval is a duration of the interval between a time the rising voltage of the divided reference signal exceeds a first threshold a time when the falling voltage of the divided reference signal falls below a second threshold. In various embodiments, the first and second thresholds are equal to one another, and thus the shape of the divided reference signal is symmetrical during this interval.

Having determined the half-period and peak interval as discussed above, the method further includes determining the frequency and phase of the divided reference signal (block 825). Using the phase, frequency, and peak magnitude information, digital values corresponding to a synthesized reference signal may then be generated (block 830). These digital values may also be stored in a memory. Since the synthesized reference signal is generated using the phase, frequency, and peak magnitude information, it is not subject to the distortion that may affect the divided reference signal at various points in its cycle, such as those that correspond to the zero-crossings of the AC input signal. To generate the synthesized reference signal in the analog domain, the digital values may be read from the memory and applied to a DAC for conversion to analog (block 835).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power factor correction (PFC) controller for a PFC switching power supply, the PFC controller comprising:
   an AC sense terminal and a DC sense terminal;
   a reference signal generator coupled to the AC sense terminal, wherein the reference signal generator is configured to:
      receive a divided reference signal generated based on a modified version of an AC input signal;
      generate a synthesized reference signal using information indicative of an amplitude and a frequency of the divided reference signal; and
      select one of the divided reference signal and the synthesized reference signal as an output reference signal based on a current amplitude of the divided reference signal;
   wherein the PFC controller is configured to, based on the output reference signal and a DC voltage sensed on the DC sense terminal, regulate output power provided to a downstream power converter coupled to the PFC switching power supply.

2. The PFC controller of claim 1, wherein the PFC controller is configured to control a power factor of the PFC switching power supply based on the output reference signal.

3. The PFC controller of claim 1, wherein the reference signal generator includes a synthesizer configured to store a plurality of digital values and further configured to generate the synthesized reference signal using the plurality of digital values.

4. The PFC controller of claim 3, wherein the reference signal generator includes a peak detector configured to determine a peak magnitude of the divided reference signal and provide an indication of the peak magnitude to the synthesizer.

5. The PFC controller of claim 3, wherein the reference signal generator further includes:
   a first comparator configured to generate a first trigger signal based on a comparison of a voltage of the divided reference signal to a first threshold value;
   a first counter configured to generate a first count value in response to assertion of the first trigger signal, wherein the first count value is indicative of a period of the divided reference signal;
   a second counter configured to generate a second count value in response to assertion of the first trigger signal; and
   a second comparator configured to cause the second counter to stop incrementing in response to comparing the voltage of the divided reference signal to a second threshold, wherein the second count value is indicative of a particular time interval.

6. The PFC controller of claim 5, wherein the reference signal generator includes a control logic configured to, using the first and second count values, cause the synthesizer to generate and store the plurality of digital values.

7. The PFC controller of claim 1, further comprising a multiplexer configured to select the one of the divided reference signal and the synthesized reference signal as the output reference signal.

8. The PFC controller of claim 7, wherein the multiplexer is configured to select the divided reference signal as the output reference signal for a first interval that includes a peak amplitude of the AC input signal and further configured to select the synthesized reference signal for a second interval that includes a zero-crossing of the AC input signal.

9. The PFC controller of claim 7, wherein the multiplexer is configured to select the synthesized reference signal as the output reference signal after a predetermined number of cycles of the AC input signal.

10. The PFC controller of claim 7, wherein the multiplexer is configured to alternate selection of the divided reference signal and the synthesized reference signal during a first interval that includes a peak amplitude of the AC input signal, and further configured to select the synthesized reference signal for a second interval that includes a zero-crossing of the AC input signal.

11. A method of operating a power factor correction (PFC) switching power supply, the method comprising:

receiving, by a voltage divider, a modified AC signal produced based on an AC input signal;

generating, using the voltage divider, a divided reference signal, wherein generating the divided reference signal includes performing a voltage division of the modified AC signal;

generating, by a PFC controller and using amplitude and frequency information of the divided reference signal, a synthesized reference signal;

selecting, by the PFC controller based on a current amplitude of the divided reference signal, one of the divided reference signal and the synthesized reference signal an output reference signal; and regulating, by the PFC controller and using the output reference signal, output power supplied to a downstream power converter coupled to the PFC switching power supply.

12. The method of claim 11, further comprising:

selecting the divided reference signal as the output reference signal for a first interval that includes a peak amplitude of the AC input signal; and selecting the synthesized reference signal for a second interval that includes a zero-crossing of the AC input signal.

13. The method of claim 11, further comprising selecting the synthesized reference signal as the output reference signal after a predetermined number of cycles of the AC input signal.

14. The method of claim 11, further comprising:

alternating selection of the divided reference signal and the synthesized reference signal during a first interval that includes a peak amplitude of the AC input signal; and selecting the synthesized reference signal for a second interval that includes a zero-crossing of the AC input signal.

15. The method of claim 11, further comprising:

storing, in a memory array of a synthesizer, a plurality of digital values; and producing the synthesized reference signal using the plurality of digital values.

16. The method of claim 15, wherein generating the plurality of digital values comprises:

comparing, using a first comparator, a voltage of the divided reference signal to a first threshold value; and generating, using a first counter, a first count value in response to the first comparator determining that the voltage of the divided reference signal exceeds the first threshold value, wherein the first count value is indicative of a period of the divided reference signal.

17. The method of claim 16, wherein generating the plurality of digital values further comprises:

incrementing, using a second counter, a second count value in response to the first comparator determining that the voltage of the divided reference signal exceeds the first threshold value;

comparing, using a second comparator, the voltage of the divided reference signal to a second threshold; and discontinuing incrementing the second counter in response to the voltage of the divided reference signal falling below the second threshold.

18. The method of claim 17, further comprising adjusting a phase of the synthesized reference signal with respect to the divided reference signal.

19. A power factor correction (PFC) switching power supply comprising:

an AC input terminal coupled to receive an AC input signal;

a filter configured to reject electromagnetic interference from the AC input signal;

a bridge rectifier configured to rectify the AC input signal to produce a rectified AC signal;

a switching unit configured to produce a DC output voltage using the rectified AC signal;

a voltage divider configured to generate a divided reference signal using a modified version of the AC input signal received by the PFC switching power supply; and a controller, wherein the controller includes a reference signal generator configured to generate an output reference signal, wherein the controller is configured to regulate output power drawn by a downstream power supply using the output reference signal, wherein the reference signal generator includes:

a peak detector configured to detect a peak amplitude of the divided reference signal;

a first comparator configured to assert a first trigger signal in response to an amplitude of the divided reference signal exceeding a threshold value;

a second comparator configured to assert a second trigger signal in response to the amplitude of the divided reference signal falling below the threshold value;

first and second counters configured to generate first and second count values, respectively, based on assertions of the first and second trigger signals;

control logic configured to receive information indicative of the peak amplitude from the peak detector and further configured to determine a period and a phase of the divided reference signal based on the first count value and further configured to determine a particular time interval relative to the peak amplitude based on the second count value;

a synthesizer configured to digitally generate a synthesized reference signal using information received from the control logic indicative of the period, the phase, and the peak amplitude of the divided reference signal; and a multiplexer, wherein the control logic is further configured to cause the multiplexer to select one of the divided reference signal and the synthesized reference signal as the output reference signal.

20. The PFC switching power supply of claim 19, wherein the control logic is configured to cause the multiplexer to select the synthesized reference signal as the output reference signal for a time interval that includes a zero-crossing of the AC input signal.

* * * * *